United States Patent
Yu et al.

(10) Patent No.: US 12,383,932 B2
(45) Date of Patent: Aug. 12, 2025

(54) ULTRASONIC VIBRATING SCREEN

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Changdong Li, Guangdong (CN); Aixia Li, Guangdong (CN); Yinghao Xie, Guangdong (CN); Xuemei Zhang, Guangdong (CN); Kang Chen, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/681,100

(22) PCT Filed: May 27, 2022

(86) PCT No.: PCT/CN2022/095691
§ 371 (c)(1),
(2) Date: Feb. 5, 2024

(87) PCT Pub. No.: WO2023/040344
PCT Pub. Date: Mar. 23, 2023

(65) Prior Publication Data
US 2025/0121410 A1    Apr. 17, 2025

(30) Foreign Application Priority Data
Sep. 14, 2021   (CN) .......................... 202111077097.2

(51) Int. Cl.
*B07B 1/28*     (2006.01)
*H01M 10/54*   (2006.01)

(52) U.S. Cl.
CPC .............. *B07B 1/28* (2013.01); *H01M 10/54* (2013.01)

(58) Field of Classification Search
CPC ................................ B07B 1/28; H01M 10/54
(Continued)

(56) References Cited

FOREIGN PATENT DOCUMENTS

CN      200984556 Y  * 12/2007
CN      102101108 A  *  6/2011
(Continued)

OTHER PUBLICATIONS

International search report of PCT Patent Application No. PCT/CN2022/095691 issued on Aug. 10, 2022.

*Primary Examiner* — Terrell H Matthews
(74) *Attorney, Agent, or Firm* — Falcon Rappaport & Berkman LLP

(57) ABSTRACT

An ultrasonic vibrating screen includes a bottom frame, at least two screen cylinders, and a vibrating mechanism. An elastic body is provided on the bottom frame; the screen cylinders are arranged in sequence from bottom to top, each screen cylinder is provided with a screen, and one of the screen cylinders is connected with the bottom frame through the elastic body. The vibrating mechanism includes a vibrating frame and at least two ultrasonic transducers, the screen cylinders are all fixed to the vibrating frame, the ultrasonic transducers are fixed to the vibrating frame, and the ultrasonic transducers drive the vibrating frame to vibrate. By
(Continued)

fixing all the screen cylinders with the vibrating frame, the amplitudes and frequencies of all ultrasonic transducers which are originally unsynchronized are unified to be the same amplitude and the same frequency as much as possible.

4 Claims, 3 Drawing Sheets

(58) Field of Classification Search
USPC .......................................................... 209/325
See application file for complete search history.

(56) References Cited

FOREIGN PATENT DOCUMENTS

| | | | | |
|---|---|---|---|---|
| CN | 204107843 U | | 1/2015 | |
| CN | 208976236 U | | 6/2019 | |
| CN | 214021892 U | * | 8/2021 | |
| CN | 214975595 U | * | 12/2021 | |
| EP | 3771500 A1 | * | 2/2021 | .......... B01F 27/1123 |

* cited by examiner

ULTRASONIC VIBRATING SCREEN

FIELD

The present application relates to the technical field of waste battery material recycling, and in particular to an ultrasonic vibrating screen.

BACKGROUND

At present, in the lithium battery recycling process, the smashed battery powder becomes black battery powder material after drying and pyrolysis. The battery powder material becomes battery powder after being smashed, and the battery powder need to be screened to be powder particles with a certain mesh size. In order to obtain these powder particles, a screen is required to be used for screening, and a vibrating screen is required in the screening process.

The multi-layer ultrasonic screens currently in use are equipped with multiple ultrasonic transducers in each layer of the screen. During operation, these ultrasonic transducers vibrate together at a high speed, driving the screen to vibrate to screen the battery powder, so as to efficiently recycle the battery powder. However, in the process of use, the service life of the ultrasonic screen is very short, and the screen is often fractured along a straight line after being used for a period of time. The service life of a new screen generally does not exceed three months, sometimes less than one month. Although many improvements and reinforcements have been made to the screen in the conventional technology, none of them solves the problem of fracture of the screen, and the screens are frequently required to be replaced during use, which causes waste of the material of the screen. Moreover, the replacement of the screen is time-consuming and laborious, and the production line should be stopped during replacement, frequent maintenance leads to a large amount of productivity loss.

SUMMARY

The technical problem to be solved by the present application is that the screen is easy to be fractured along a straight line.

In order to solve the above technical problem, an ultrasonic vibrating screen is provided according to the present application, which includes a bottom frame, at least two screen cylinders, and a vibrating mechanism. An elastic body is provided on the bottom frame, the screen cylinders are arranged from bottom to top in sequence, each screen cylinder is provided with a screen, and one of the screen cylinders is connected with the bottom frame through the elastic body. The vibrating mechanism includes a vibrating frame and at least two ultrasonic transducers. The screen cylinders are all fixed to the vibrating frame, the ultrasonic transducers are fixed to the vibrating frame, and the ultrasonic transducers drive the vibrating frame to vibrate.

In an embodiment, the vibrating frame includes a bracket and at least two vibrating rings, and the vibrating rings are in one-to-one correspondence with the screen cylinders. Each of the vibrating rings is sleeved on an outer side surface of the corresponding screen cylinder and is fixed to the screen cylinder, and the vibrating rings are fixed by the bracket.

In an embodiment, the number of the bracket is multiple, and each of the brackets extends from top to bottom, each of the brackets is fixed with at least one ultrasonic transducer, and the brackets are distributed at intervals around outer surfaces of the screen cylinders.

In an embodiment, the ultrasonic transducers are distributed at intervals around the outer surfaces of the screen cylinders and are arranged on the brackets.

In an embodiment, the vibrating mechanism further includes a connecting piece, and each two of the brackets are fixed by the connecting piece.

In an embodiment, the ultrasonic vibrating screen further includes at least one positioning block, the positioning block is sleeved on the connecting piece, and the positioning block is connected with the screen cylinder.

In an embodiment, the connecting piece is an arc-shaped rod, and the positioning block is slidably sleeved on the connecting piece.

In an embodiment, the positioning block includes a top block, a body and a telescopic block, and the connecting piece is sandwiched between the top block and the body; the telescopic block is located at a side of the body away from the top block, and the telescopic block abuts against the screen cylinder; the top block is provided with a threaded through hole, the body is provided with a penetration hole corresponding to the threaded through hole, and a clamping rod is arranged in the penetration hole; the threaded through hole is screwed with an adjusting screw, the adjusting screw abuts against one end of the clamping rod, and the other end of the clamping rod away from the adjusting screw abuts against the telescopic block.

In an embodiment, the ultrasonic vibrating screen further includes a counterweight block, and the counterweight block is connected with the vibrating frame or the connecting piece.

In an embodiment, the counterweight block has an annular shape, and the counterweight block is slidably sleeved on the connecting piece; a threaded hole is provided on a side surface of the counterweight block, a fixing screw is screwed into the threaded hole, and the fixing screw passes through the threaded hole and abuts against the connecting piece.

Compared with the conventional technology, the ultrasonic vibrating screen according to the present application has the following beneficial effects. By fixing all the screen cylinders with the vibrating frame, the amplitudes and frequencies of all ultrasonic transducers which are originally unsynchronized are unified to be the same amplitude and the same frequency as much as possible. In this way, all screen cylinders maintain a uniform vibration frequency in the process of screening battery powder, which avoids the situation that the screen is constantly bent and then fractured along a specific straight line under action of different parts of screen cylinders due to the non-uniform or even reversed vibration forces acting on the different parts.

Figure 1:
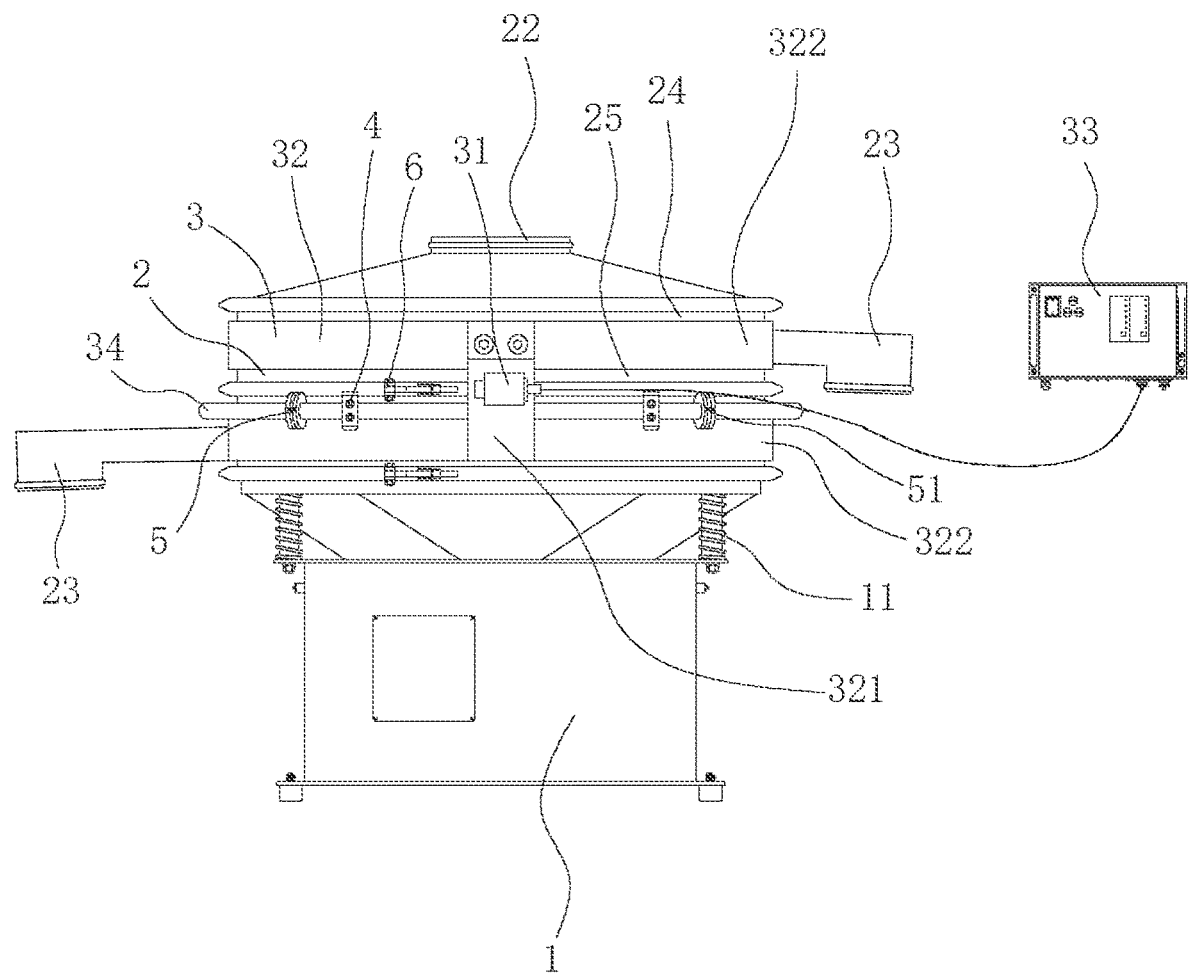
FIG. 1 is a schematic view showing the structure of an embodiment of the present application.

REFERENCE NUMERALS IN THE DRAWINGS 1 bottom frame, 11 elastic body,
2 screen cylinder, 21 screen,
22 material inlet, 23 material outlet,
24 upper rack, 25 lower rack,
3 vibrating mechanism, 31 ultrasonic transducer, 32 vibrating frame, 321 bracket,
322 vibrating ring, 33 ultrasonic generator,
34 connecting piece,
4 positioning block, 41 top block,
411 threaded through hole, 42 body,
421 penetration hole, 43 telescopic block,
44 threaded clamping rod, 45 adjusting screw,
5 counterweight block, 51 threaded hole,
6 clamping hook.

DETAILED DESCRIPTION OF THE EMBODIMENTS

The present application is described below in detail in conjunction with the drawings and embodiments. The following embodiments are used to illustrate the present application, but not to limit the scope of the present application.

In the description of the present application, it should be noted that the orientation or positional relationships indicated by terms such as "up", "down", "left", "right", "front", "rear", "top", "bottom" and the like are based on the orientation or positional relationships shown in the drawings, and are merely for the convenience of describing the present application and the simplification of the description, and do not indicate or imply that the device or element referred to must have a particular orientation, or be configured and operated in a particular orientation, which therefore should not be construed as a limitation to the scope of the present application.

As shown in FIG. 1, an ultrasonic vibrating screen according to a preferred embodiment of the present application includes a bottom frame 1, at least two screen cylinders 2 and a vibrating mechanism 3. The vibrating mechanism 3 drives all the screen cylinders 2 to vibrate synchronously, and the screen cylinders 2 screen the battery powder through ultrasonic vibration.

Figure 2:
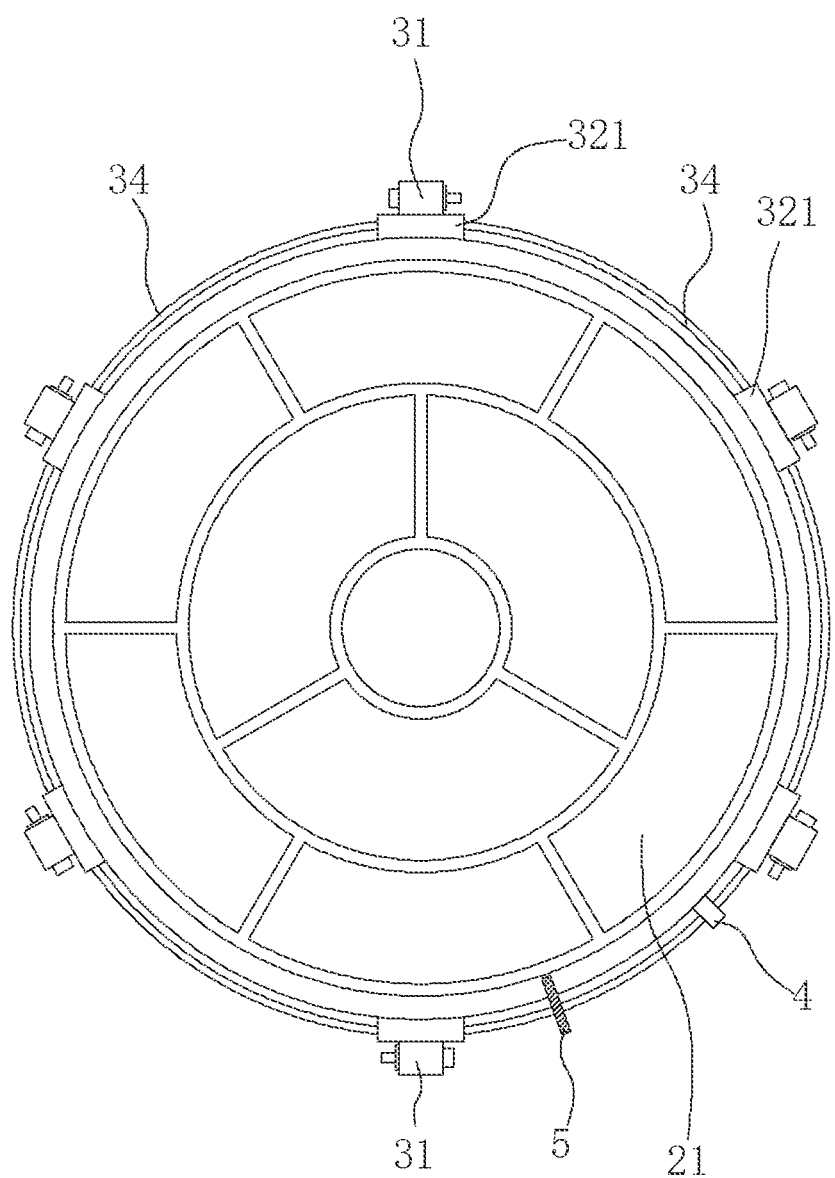
FIG. 2 is a top view of an embodiment of the present application.

As shown in FIG. 1 and FIG. 2, the bottom frame 1 may be placed on the ground or on a table, the bottom frame 1 is used to support the screen cylinders 2. An elastic body 11 is provided on the bottom frame 1, and the elastic body 11 is a spring. In this embodiment, two screen cylinders 2 are provided. In other embodiments, the number of the screen cylinder 2 may be adjusted according to actual requirements. The screen cylinders 2 are arranged sequentially from bottom to top, and each of the screen cylinders 2 is provided with a screen 21. The lowermost screen cylinder 2 is connected to the bottom frame 1 through the elastic body 11, and the uppermost screen cylinder 2 is provided with a material inlet 22 for introducing raw materials. Each screen cylinder 2 is provided with a material outlet 23, and the material outlet 23 is used for discharging the screened battery powder particles. The vibrating mechanism 3 includes ultrasonic transducers 31 and a vibrating frame 32. The screen cylinders 2 are both fixed to the same vibrating frame 32. The ultrasonic transducers 31 are fixed to the vibrating frame 32, and the ultrasonic transducers 31 drive the vibrating frame 32 to vibrate. In this embodiment, the ultrasonic transducers 31 are connected to an ultrasonic generator 33, and the ultrasonic generator 33 sends an electrical signal to vibrate the ultrasonic transducers 31. In other embodiments, the ultrasonic transducers 31 may be directly connected to an external power source, and the ultrasonic transducers 31 may generate vibration alone.

As shown in FIG. 1 and FIG. 2, the operating process of the present application is: the ultrasonic generator 33 is turned on, after the ultrasonic transducers 31 receive the electrical signal, the ultrasonic transducers 31 drive the vibrating frame 32 to vibrate, and the vibrating frame 32 drives all the screen cylinders 2 to vibrate together. To sum up, according to the ultrasonic vibrating screen in the embodiment of the present application, by fixing all the screen cylinders 2 with the vibrating frame 32, the amplitudes and frequencies of all ultrasonic transducers 31 which are originally unsynchronized are unified to be the same amplitude and the same frequency as much as possible. The entire screen cylinder 2 maintains a uniform vibration frequency when screening battery powder, which avoids the situation that the screen 21 is constantly bent and then fractured along a specific straight line under action of different parts of screen cylinders 2 due to the non-uniform or even reversed vibration forces acting on the different parts.

As shown in FIG. 1, the vibrating frame 32 includes a bracket 321 and at least two vibrating rings 322, and the vibrating rings 322 are in one-to-one correspondence with the screen cylinders 2. Each of the screen cylinders 2 is fixed with a corresponding vibrating ring 322, and the vibrating ring 322 is sleeved on an outer side surface of the screen cylinder 2 and fixed with the screen cylinder 2. Each of the screen cylinders 2 includes a central part, an upper rack 24 and a lower rack 25. The central part is located between the upper rack 24 and the lower rack 25. In the two adjacent screen cylinders 2, the lower rack 25 of the upper screen cylinder 2 is fixed to the upper rack 24 of the lower screen cylinder 2 through a clamping hook 6. The vibrating ring 322 is fixed at the central part, and the vibrating rings 322 are fixed by the bracket 321. By fixing the vibrating rings 322 via the bracket 321, the vibrating frame 32 is integrated, and the consistency of amplitude and frequency of the vibrating frame 32 is improved. The number of the bracket 321 is multiple, and the bracket 321 extends from top to bottom. Each bracket 321 is fixed with at least one ultrasonic transducer 31, and the brackets 321 are uniformly distributed at intervals around the outer surface of the screen cylinder 2. The vibration amplitudes and frequencies of all ultrasonic transducers 31 are the same. In this embodiment, the screen cylinder 2 is cylindrical, and the number of bracket 321 is six. The brackets 321 are equidistantly distributed around a central axis of the screen cylinder 2, which ensures that when the brackets 321 transmit ultrasonic vibration to the screen cylinders 2, each part of the screen cylinder 2 is uniformly affected by the vibrating frame 32. The ultrasonic transducers 31 are uniformly distributed at intervals around the outer surface of the screen cylinder 2 and are arranged on the brackets 321, ensuring that all the brackets 321 generate the same amplitude and the same frequency, so that each part of the screen cylinder 2 is uniformly vibrated.

As shown in FIG. 1 and FIG. 2, the vibrating mechanism 3 further includes a connecting piece 34, and each two brackets 321 are fixed to each other by the connecting piece 34. A distance between the connecting piece 34 and the ultrasonic vibrating frame 32 is adjustable. The connecting piece 34 effectively improves the vibration consistency between the brackets 321, which avoids the regular deformation of the screen cylinder 2 caused by repeated changes of the amplitude between the brackets 321, and further avoids the phenomenon that the screen 21 is fractured due to repeated bending along the fixed crease, and thereby prolonging the service life of the screen. The ultrasonic vibrating screen further includes at least one positioning block 4. The positioning block 4 is sleeved on the connecting piece 34, and the positioning block 4 is connected with the screen cylinder 2. In the process of screening battery powder by the screen 21, by adjusting the position of the positioning block 4, a center of gravity of the screen 21 and the natural frequencies of different positions are adjusted. The bending line on the screen 21 is changed, which prevent the screen 21 from being fractured. The connecting piece 34 is an arc-shaped screw rod with threads provided at opposite ends of the connecting piece 34, and each of the ends of the connecting piece 34 is threadedly connected to the bracket 321 through threads. The positioning block 4 is slidably sleeved on the connecting piece 34. The operator may change the position of the positioning block 4 by directly sliding the positioning block 4 on the connecting piece 34, so as to realize quick adjustment of the positioning block 4.

Figure 3:
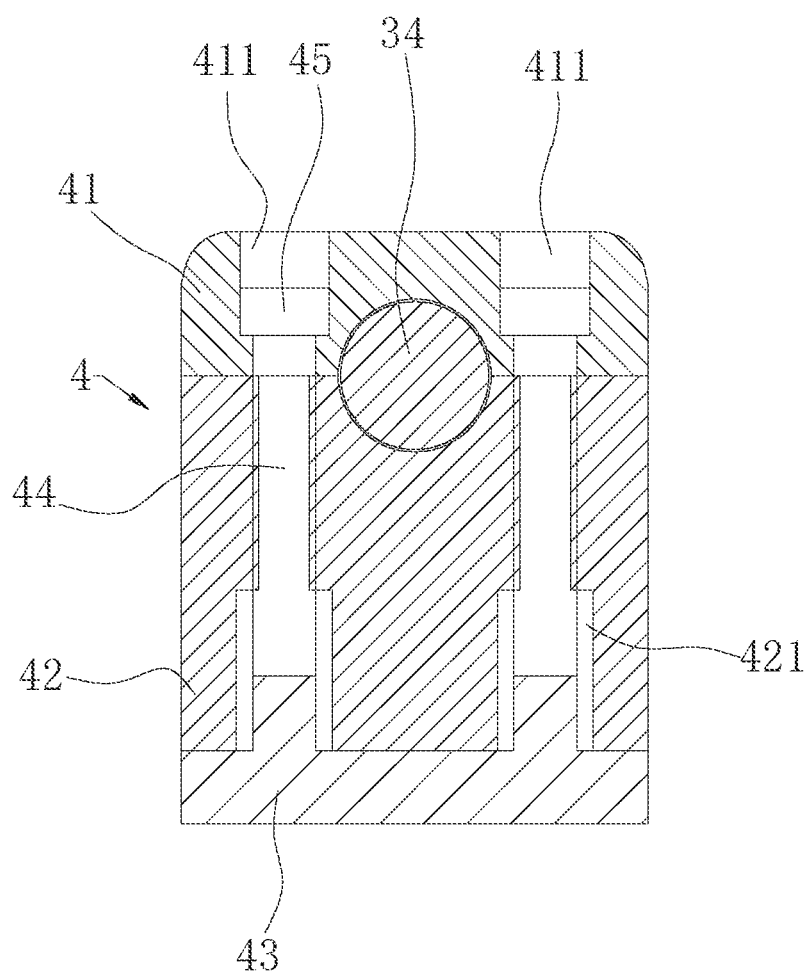
FIG. 3 is a cross-sectional view of a positioning block.

As shown in FIG. 1 to FIG. 3, the positioning block 4 includes a top block 41, a body 42 and a telescopic block 43. The connecting piece 34 is sandwiched between the top block 41 and the body 42. The telescopic block 43 is located at a side of the body 42 away from the top block 41, and the telescopic block 43 abuts against the screen cylinder 2. The top block 41 is provided with a threaded through hole 411, the body 42 is provided with a penetration hole 421 corresponding to the threaded through hole 411, the penetration hole 421 directly faces the threaded through hole 411, and a clamping rod 44 is arranged in the penetration hole 421. The threaded through hole 411 is screwed with an adjusting screw 45, the adjusting screw 45 abuts against one end of the clamping rod 44, and the other end of the clamping rod 44 away from the adjusting screw 45 abuts against the telescopic block 43. The clamping rod 44 moves along with the adjusting screw 45. The telescopic block 43 is a silica gel block or a plastic block with a certain degree of toughness, and the telescopic block 43 improves the cushioning effect on the screen cylinder 2. The operator may rotate the adjusting screw 45 to make the adjusting screw 45 extend into or out of the threaded through hole 411, to change an extending length of the adjusting screw 45 in the threaded through hole 411, so as to change the pressure of the clamping rod 44 acting on the telescopic block 43, to adjust the tightness between the positioning block 4 and the screen cylinder 2. The telescopic block 43 indirectly increases the contact fixing points between the vibrating frame 32 and the screen cylinder 2, so that the center of gravity of the screen 21 and the screen cylinder 2 changes, which prevents the screen 21 from being fractured due to repeated bending along the bending line.

As shown in FIG. 1, the ultrasonic vibrating screen further includes a counterweight block 5. The counterweight block 5 is connected with the vibrating frame 32 or the connecting piece 34. In the process of screening battery powder by the screen 21, by adjusting the position of the counterweight block 5, the center of gravity of the screen 21 and the natural frequencies of different positions are adjusted. The bending line on the screen 21 is changed, which prevents the screen 21 from being fractured. The counterweight block 5 has an annular shape, and the counterweight block 5 is slidably sleeved on the connecting piece. A threaded hole 51 is provided on a side surface of the counterweight block 5. A fixing screw is screwed into the threaded hole 51, and the fixing screw passes through the threaded hole 51 and abuts against the connecting piece 34. The operator may change the position of the counterweight block 5 by sliding the counterweight block 5 on the connecting piece 34. Then, by tightening the fixing screw, the fixing screw on the counterweight block 5 abuts against the connecting piece, thereby locking the position of the counterweight block 5 on the connecting piece 34.

The above description is only preferable embodiments of the present application. It should be noted that those skilled in the art can make improvements and substitutions without departing from the technical principle of the present application. These improvements and substitutions should also fall within the protection scope of the present application.

The invention claimed is:

1. An ultrasonic vibrating screen, comprising:
   a bottom frame, wherein an elastic body is provided on the bottom frame;
   at least two screen cylinders, wherein the screen cylinders are arranged from bottom to top in sequence, each of the screen cylinders is provided with a screen, and one of the screen cylinders is connected to the bottom frame via the elastic body;
   a vibrating mechanism, wherein the vibrating mechanism comprises a vibrating frame, at least two ultrasonic transducers, and a connecting piece; wherein the screen cylinders are all fixed to the vibrating frame, the ultrasonic transducers are fixed to the vibrating frame, and the ultrasonic transducers are configured to drive the vibrating frame to vibrate, wherein the vibrating frame comprises at least two vibrating rings and a plurality of brackets, the vibrating rings are in one-to-one correspondence with the screen cylinders; wherein each of the vibrating rings is sleeved on an outer side surface of the corresponding screen cylinder and is fixed to the corresponding screen cylinder, and the vibrating rings are fixed with each other by the bracket;
   wherein each of the brackets extends from top to bottom, each of the brackets is fixed with at least one of the ultrasonic transducers, and the brackets are distributed at intervals around outer surfaces of the screen cylinders, wherein the connecting piece is an arc-shaped rod, and each two of the brackets are fixed with each other by the connecting piece; and
   at least one positioning block, wherein the positioning block is slidably sleeved on the connecting piece, the positioning block is connected with one of the screen cylinders, the positioning block comprises a top block, a body and a telescopic block, wherein the connecting piece is sandwiched between the top block and the body; and wherein the telescopic block is located at a side of the body away from the top block, and the telescopic block abuts against the one of the screen cylinders; and the top block is provided with a threaded through hole, the body is provided with a penetration hole corresponding to the threaded through hole, and a clamping rod is arranged in the penetration hole; an adjusting screw is screwed in the threaded through hole, the adjusting screw abuts against one end of the clamping rod, and the other end of the clamping rod away from the adjusting screw abuts against the telescopic block.

2. The ultrasonic vibrating screen according to claim 1, wherein the ultrasonic transducers are distributed at intervals around the outer surfaces of the screen cylinders and are arranged on the brackets.

3. The ultrasonic vibrating screen according to claim 1, further comprising a counterweight block, wherein the counterweight block is connected with the vibrating frame or the connecting piece.

4. The ultrasonic vibrating screen according to claim 3, wherein the counterweight block has an annular shape, and the counterweight block is slidably sleeved on the connecting piece; wherein a threaded hole is provided on a side surface of the counterweight block, a fixing screw is screwed into the threaded hole, and the fixing screw passes through the threaded hole and abuts against the connecting piece.

* * * * *